United States Patent [19]

Turner et al.

[11] 3,916,184

[45] Oct. 28, 1975

[54] OPTICAL SCANNER IN MODULAR FORM

[75] Inventors: Thomas W. Turner, Marcellus; Frederick J. Elia, Manlius, both of N.Y.

[73] Assignee: Welch Allyn, Inc., Skaneateles Falls, N.Y.

[22] Filed: Jan. 16, 1974

[21] Appl. No.: 433,717

[52] U.S. Cl. ................ 250/227; 250/216; 250/239; 178/DIG. 2

[51] Int. Cl.² ............................................ G02B 5/14

[58] Field of Search .................... 250/216, 227, 239; 350/96 R, 96 B; 178/DIG. 2

[56] References Cited

UNITED STATES PATENTS

| | | | |
|---|---|---|---|
| 3,097,302 | 7/1963 | Wayne et al. | 250/239 X |
| 3,130,317 | 4/1964 | Connelly et al. | 250/239 X |
| 3,758,782 | 9/1973 | Radford et al. | 250/227 |
| 3,792,284 | 2/1974 | Kaelin | 250/227 |
| 3,809,893 | 5/1974 | Dobras | 250/227 |

*Primary Examiner*—Walter Stolwein
*Attorney, Agent, or Firm*—Bruns & Jenney

[57] ABSTRACT

A relatively inexpensive optical scanner assembled from separately constructed mass producible modules. An easily replaceable power module includes a power cable of varying lengths and a light source. A sensor module includes a photosensor and an amplifying circuit. Appropriate plug means join the power module to the sensor module. An illuminating optic module including a light transmitting fiber bundle transmits illumination from the light source to the target. A receiving optics module includes an easily modifiable lens system for focusing the light reflected from the target on the photosensor. An optional filter, positioned between the power module and the illuminating module, and an optional filter, positioned between the receiving module and the sensor module, aid in the scanning of targets which are in colors other than black and white.

4 Claims, 5 Drawing Figures

OPTICAL SCANNER IN MODULAR FORM

BACKGROUND OF THE INVENTION

This invention relates to optical scanners, and in particular to novel optical scanners assembled from separately constructed mass producible modules.

Existing hand held scanners will work well under certain specific conditions involving: resolution, linearity, signal level, wavelength of light, depth of focus, response time, electronic signal characteristics, physical size and environment. Each device will function properly when it is used under the exact conditions for which it was designed, but the requirements are so varied that seldom will a device work well in two different applications. A food market may have to read a bar code on a flat breakfast cereal box, while a warehouseman may be required to read a bar code through 15 hundredths of an inch of protective glass. A retail store may want the clerk to move the scanner slowly over the marked merchandise, while a railroad company may want a fixed scanner to read a code on a rapidly moving box car. One user may wish to read red markings on a green background, while another may wish to read bar code with infrared light. Also, different host machines to which the probe is attached may have different signal requirements and each user may have a need for a different length cord.

As is seen, there are a large number of characteristics that can be combined in an infinite number of variations; this makes the construction task difficult. Either users must change their application to fit the characteristics of a standard scanner or a customized scanner must be built for each application which up to now has been very expensive.

SUMMARY OF THE INVENTION

This invention provides an optical scanner that can be modularly assembled. By manufacturing the major components of this scanner in larger quantities than would be possible if each application were handled with a specifically built device, the cost of these scanners can be kept low. Also each component may be detached from the others and a replacement made, thereby ending the need to scrap the entire scanner when there is an improperly functioning part or a change in the user's requirements. In addition, the modular construction of this device allows for the field replacement of components particularly susceptible to damage through wear and abuse (electrical cable, light source and protective tip).

The scanner of the invention is assembled from four separately constructed modules: the illuminating optics module, the receiving optics module, the sensor module and the power module.

The illuminating optics module includes an optical fiber bundle enclosed in a protective tube which terminates in a protective tip. Light from the input end of the optical fiber bundle is transmitted by the optical fibers to exit in a ring of light inside the tip. The numerical aperture of the light and the conical geometry of the tip cause the illumination to flood the target in an optimal fashion.

The receiving optics module includes a lens system which focuses the reflected light to be received by the sensor module. Varying the components of this lens system will vary, among other things, the scanner's depth of focus and resolution.

The sensor module includes a light sensor, an amplifying circuit and means to connect this circuit to the power module. Light coming from the lens system generates current proportionally to the light incident upon the photosensor. The amplifier circuit increases the power of the signal for transmission to the host.

The power module includes the light source and the electrical cable which supplies power to the light source and the amplifier circuit, and which also carries the output signal from the amplifier circuit to the host.

Filters are optional and may be positioned between the power module and the illuminating module, and/or between the receiving module and the sensor module for reading other than black and white images.

DESCRIPTION OF THE PREFERRED EMBODIMENT

Figures 1, 5:
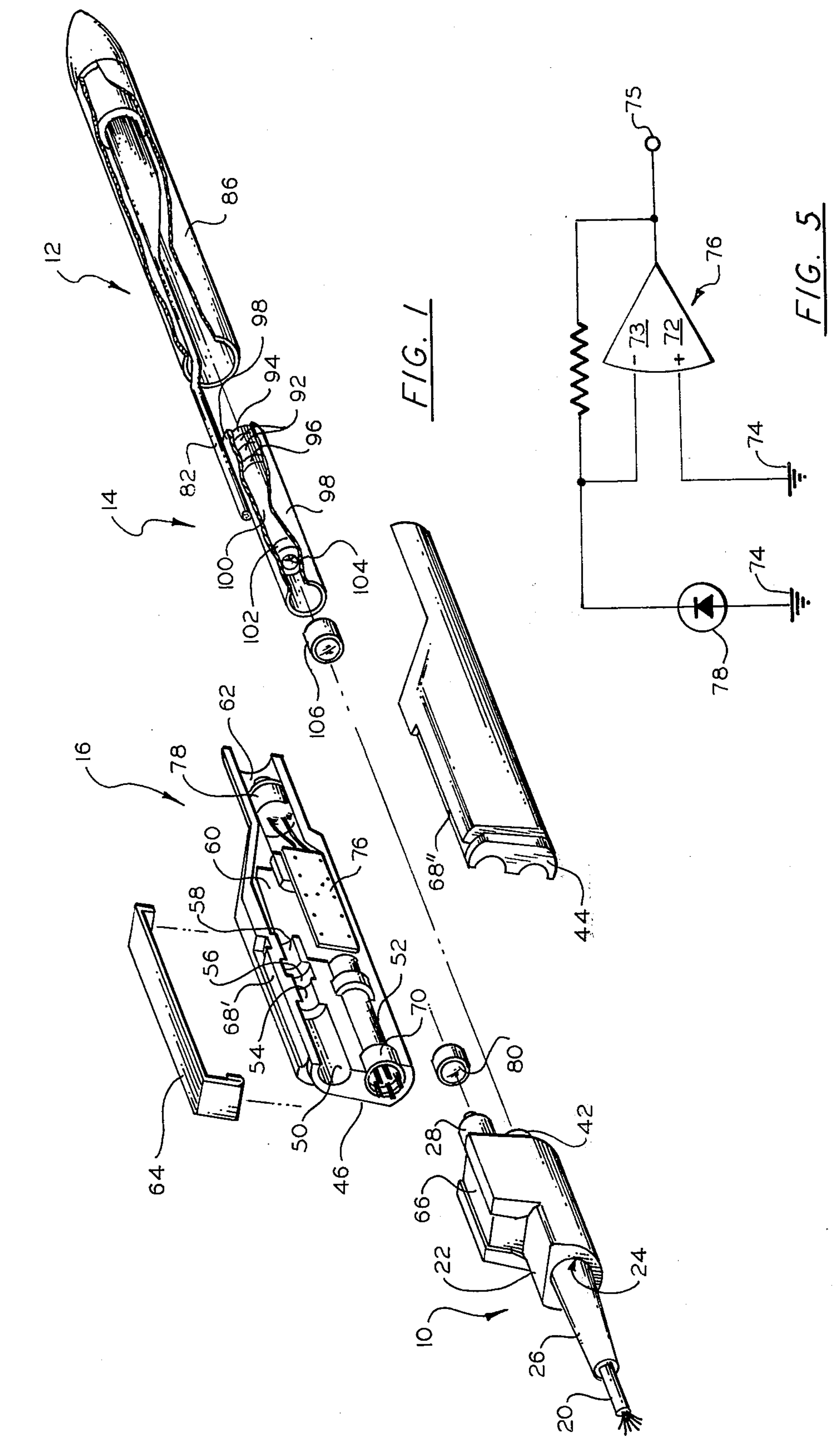
FIG. 1 is an exploded view of a modular optical scanner embodying the invention with the outer lens tube and cover tube partially broken away for clarity.
FIG. 5 is a representative circuit diagram of the sensor module.
Figure 3:
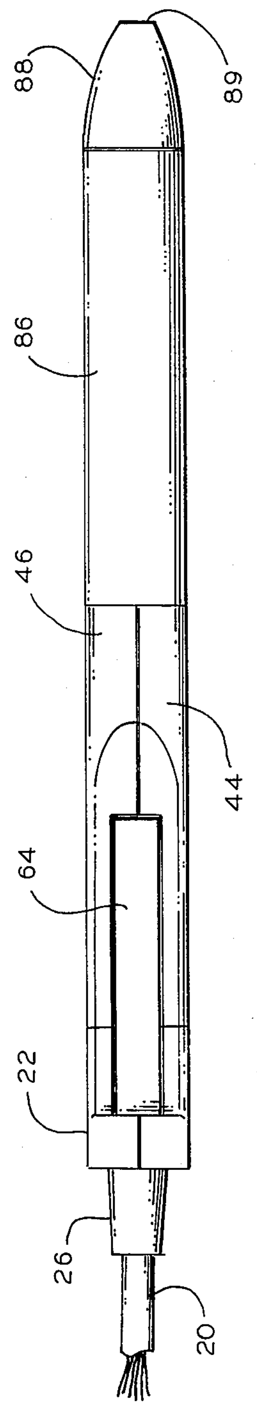
FIG. 3 is a top plan view of the optical scanner.

As seen in FIG. 1, the scanner disclosed herein is assembled from four individually manufactured modules: the power module indicated generally at 10, the illuminating optics module indicated generally at 12, the receiving optics module indicated generally at 14, and the sensor module indicated generally at 16.

Figure 2:
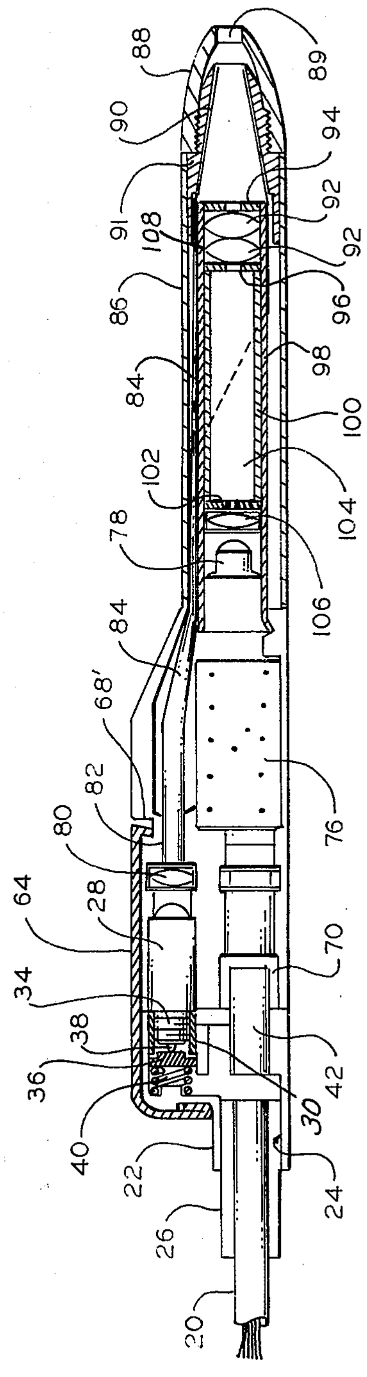
FIG. 2 is a longitudinal section through the optical scanner on line 2—2 of FIG. 4.
Figure 4:
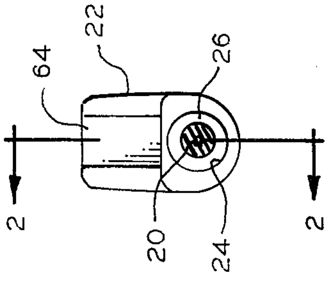
FIG. 4 is a left end view of the optical scanner.

Referring now in particular to FIGS. 1 and 2, an insulated six wire electrical cable 20 extending from the host machine (not shown) enters the rear housing 22 of the power module 10 through aperture 24. A flexible relief sleeve 26 encircles the cable as it passes through the aperture to prevent the insulation of the cable from wearing. Two of the wires (not shown) from cable 20 provide the electrical power for light source 28. Light source 28 may be interchanged to provide versatility of operation from broad band incandescent lamp sources with high output power to monochromatic light emitting diodes with low power requirements.

Connecting the two electrical wires to the light source 28 is a cylinder 30 with a tapped inner diameter, forming the ground contact for the threaded base 34 of the light source 28 and a power contact 36 biased against the center, power contact 38 of the light source by coil spring 40. The remaining four wires of the six wire cable are attached to a male connector 42 extending from the lower portion of the rear housing 22.

The sensor module includes mating side housings 44 and 46, side housing 44 being a mirror image of side housing 46. Semi-cylindrical recesses 50 through 62 in side housing 46 have mirrored semi-cylindrical recesses in side housing 44. When the side housings 44, 46 are mated the semi-cylindrical recesses are combined thereby forming cylindrical cavities.

The design of these side housings 44 and 46 contributes to the modularity of this device. Besides holding the elements of the sensor module 16, the cavities, formed by the mating recesses 50 through 62, provide the connecting means between the power module 10 and the illuminating optics module 12 and the connecting means between the sensor module 16 and the receiving optics module 14. After the four modules have been individually constructed they are combined (as will be described) into one device by the mating of these side housings 44 and 46.

A clip 64, hooked in a recess 66 of the power module and the recess formed by mating recesses 68' and 68'', releaseably secures the mated side housings 44, 46 to the power module 10. With the power module 10 connected to the mated side housings 44 and 46 of module 16, the light source 28 extends from the power module into the cavity formed by recesses 50. The male connector 42 of the power source 10 extends into the mated side housings 44, 46 where it connects with a corresponding female connector 70 within the cavity formed by recesses 52. As can be seen, the power module can be disassociated from the mated side housings in the field by removing clip 64, whereby the light source 28 can be replaced or a new power module 10 substituted.

The sensor module indicated at 16 includes the female connector 70, whereby four of the wires (not shown) of the power cable 20 are electrically connected to the sensor module. In the preferred embodiment these wires carry a positive voltage 72, see FIG. 5, a negative voltage 73, ground 74 and the signal 75 from the amplifier circuit 76 back to the host (not shown). In FIGS. 1 and 2 the amplifier 76 is indicated by a circuit card within the cavity formed by recesses 60. The input to this amplifier circuit, FIG. 5, is a current from a photosensor 78, here a photocell.

The sensor module circuit of FIG. 5 is only symbolic and, as is well known in the art, the actual components of this circuit will depend on the input and the desired output. As the application varies it may be necessary for the amplifier to increase the power of the signal, have less noise and handle a higher frequency. Also, as the applications vary it may be desirable to use a phototransistor or a photodiode in place of the photocell 78. Both of these changes can be easily handled by this sensor module as the cavities formed by mated recesses 60 and 62 will accommodate a different photosensor and a more complex amplifier circuit — as long as the circuit card size remains constant. The elements of the sensor module are electrically connected in mass quantities so that, as the modules of the scanner are assembled, it is only necessary to drop the preconnected amplifier card 76 into the cavity formed by recesses 60, photosensor 78 into the cavity formed by recesses 62 and female connector into the cavity formed by recesses 52.

The light source 28, FIGS. 1 and 2, being received in the cavity formed by recesses 50 has its light rays pass through the cavity formed by recesses 54. The cavity formed by recesses 56 is dimensioned to receive an optical filter 80 whereby the properties (wavelength, color, intensity) of the light on the target can be affected. The light rays after passing through the cavity formed by recesses 56 — or through a filter positioned in this cavity — will enter the input end 82 of an optical fiber bundle 84. This input end 82 is received when the scanner is assembled in the cavity formed by recesses 58.

The fiber optics bundle 84 extends through a cover tube 86 and terminates within protective tip 88. This protective tip 88 is conical in shape with a circular aperture 89 at its small end. From a cylindrical shape at its input end 82, the fiber bundle 84 becomes an annular bundle at the distal end 90 thereof as seen in FIG. 2. The light transmitted by the bundle exits in a ring of light within the tip 88 and passes through aperture 89 to strike the target. The numerical aperture (the tangent of the angle through which the light leaves the fiber bundle) is such that, along with the conical geometry of the inside of the tip 88, the target is caused to be flooded with maximum light, while the spectral reflection is minimized, thereby minimizing the spectral reflections effect on the sensor module. The protective tip 88 is threaded onto a collar 91 that is cemented to the distal end 90 of the fiber bundle 84. The tip 88 is easily removed by unscrewing it from the collar 91 thereby making replacement of a damaged tip a simple task.

The light striking the target area will be reflected in an amount inversely proportional to the amount of light absorbed. A white strip in a bar code will reflect the most light while a black strip will reflect the least. A portion of this reflected light will pass through the aperture 89 in tip 88 and fall upon the receiving optics module 14. This module preferably consists of two lenses 92 with aperture members 94 and 96, consisting of an opaque disc with a center opening, on each side of the lenses 92, all enclosed in an outer lens tube 98. Separated from the lenses by an inner lens tube 100 is an image aperture member 102 consisting of an opaque disc with a center opening.

As is well known in the art, more or less than two lenses may match the performance of the two lens system used here but for economy reasons the two lens system is preferred. Also the use of two aperture members 94 and 96, one on each side of the lenses, isn't mandatory. The right aperture member 94 decreases the effective size of the lens 92, while the left aperture 96 merely lessens the reflections from the surfaces of the lenses. It is apparent that the above functions could be performed by decreasing the diameter of the lenses 92 or by using one aperture member and a more responsive amplifying system. The inner lens tube 100 is merely for spacing and can be replaced by other means to ensure the desired relative position of the image aperture member 102 to the lenses 92.

The use of the above described lens system permits the scanner of the invention to be customized to read code from all known applications. Aperture members 94 and 96 can have their center openings decreased in size to increase the depth of field or increased in size to allow more light to be received and therefore allow a more rapid movement of the scanner over the target. The lenses 92 can be moved away from tip 88 decreasing the size of the image falling on the image aperture member 102 and thereby decreasing the effect of a defect on the target material; or the lenses 92 can be moved toward the tip 88 increasing the size of the image falling on the image aperture member 102 and thereby permitting the reading of a smaller code. The length of inner lens tube 100 is varied to maintain correct focus for the above situations. By increasing or decreasing the center opening in the image aperture member 102 the size of the bar code which will affect the output signal can be varied.

As an example of the possible characteristics of this system, with a good quality lens without magnification and with an aperture member 102 with 0.15 inch diameter center opening, and image aperture member 94 or 96 with 0.004 inch diameter center opening, a resolution of 5 line pairs/mm and a depth of field of 0.100 inches can be obtained.

The image aperture end 104 of the receiving optics module is received within the cavity formed by the mating recesses 62. The photosensor 78 is adjacent the image aperture member 102 within the cavity. Between the image aperture member 102 and the photosensor 78 is an application dependent filter 106. For an application calling for reading black bars on a white background no filter is needed but if the application calls for reading green bars on a white background a filter blocking green light would increase the signal variation. When an application calls for reading green bars on a red background, the filter is necessary to block green light so that there is a recordable variation in intensity of light incidence on the photosensor filter 106.

Filter 80 can be replaced with a similar filtering system whereby the target would be flooded with light of all wavelengths except the wavelength of the bar color. If this were done, however, errors could occur if extraneous light of the bar's wavelength existed in the target's environment.

The receiving optics module 14 is positioned within the cover tube 86. While running parallel to the fiber optics bundle 84 at the image aperture end 104, the receiving optics module 14 becomes encircled by the fiber bundle at the target end 108. Further, with the image aperture end 104 of the receiving optics module received in the cavity formed by mated recesses 62, the cover tube 86 forms a sleeve on the outer circumference of the cavity walls as best seen in FIG. 2.

A possible modification of this device involves removing the light source 28 and the illuminating optics module 12, thereby creating a device for reading an externally illuminated code. This device would be suitable for use with a cathode ray tube.

From the foregoing description, it will be apparent that the invention provides a novel and very versatile modular optical scanner. As will be apparent to those familiar with the art, the invention may be embodied in other specific forms without departing from the spirit or essential characteristics thereof.

We claim:

1. An optical scanner modularly constructed for easy modification including:

a power module having a housing with an aperture, a power cable received in the aperture, a light source electrically connected to the power cable, and a first electrical connecting means;

a sensor module having a photosensor for producing an electrical signal upon the incidence of light, an amplifier for magnifying the signal from the photosensor, and a second electrical connecting means for joining the sensor module to the first electrical connecting means;

an illuminating optics module connected to said sensor module having a protective tube, a protective tip with an aperture, and a fiber bundle with an input end for transmitting light from the light source to the protective tip; and a receiving optics module connected to said optics module having a lens tube with an image end and an object end, at least one lens, and at least one opaque disc spaced from the lens and having a center opening therein, said lens tube having its lens and disc received within the protective tube whereby light passing through the aperture in the protective tip of the illuminating optics module will pass through the lens and fall upon the disc and then upon the photosensor.

2. The optical scanner as defined in claim 1 wherein the sensor module includes:

a pair of complementary side housings having mating semi-cylindrical recesses which form cylindrical cavities when the side housings are mated, said cylindrical cavities being dimensioned to receive: the image aperture end of the lens tube of the receiving optics module, the input end of the fiber bundle of the illuminating optics module, said cavities also being dimensioned to pass illumination from the light source to the input end of the fiber optics bundle.

3. The optical scanner as defined in claim 1 wherein the receiving optics module includes at least one opaque disc positioned adjacent the lens and having a center opening therein.

4. The optical scanner as defined in claim 1 including a filter between the photosensor of the sensor module and the receiving optics module.

* * * * *